United States Patent
Yang et al.

(10) Patent No.: US 11,330,659 B2
(45) Date of Patent: May 10, 2022

(54) METHOD FOR PROCESSING EXCEPTIONAL CASE OF ESTABLISHING DEFAULT BEARER IN MOBILE COMMUNICATION SYSTEM AND DEVICE THEREFOR

(71) Applicant: Electronics and Telecommunications Research Institute, Daejeon (KR)

(72) Inventors: Mi Jeong Yang, Daejeon (KR); Jae Wook Shin, Daejeon (KR); Ae-Soon Park, Daejeon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 0 days.

(21) Appl. No.: 16/152,329

(22) Filed: Oct. 4, 2018

(65) Prior Publication Data

US 2019/0037628 A1   Jan. 31, 2019

Related U.S. Application Data

(63) Continuation of application No. 15/417,989, filed on Jan. 27, 2017, now abandoned, which is a
(Continued)

(30) Foreign Application Priority Data

Aug. 11, 2008   (KR) ................ 10-2008-0078446
Jul. 27, 2009   (KR) ................ 10-2009-0068532

(51) Int. Cl.
*H04W 76/18* (2018.01)
*H04W 8/02* (2009.01)
(Continued)

(52) U.S. Cl.
CPC ............ *H04W 76/18* (2018.02); *H04W 8/02* (2013.01); *H04W 72/0406* (2013.01); *H04W 80/04* (2013.01)

(58) Field of Classification Search
CPC .................................................... H04W 76/18
See application file for complete search history.

(56) References Cited

U.S. PATENT DOCUMENTS

2010/0081435 A1   4/2010   Huang

FOREIGN PATENT DOCUMENTS

| KR | 10-2004-0021081 A | 3/2004 |
|---|---|---|
| WO | 2008/063545 A1 | 5/2008 |
| WO | 2008/069494 A1 | 6/2008 |

OTHER PUBLICATIONS

Qualcomm Europe, "Update on default bearer context activation" (http://www.3gpp.org/DynaReport/TDocExMtg-C1-53-26747.htm, May 2009) (Year: 2009).*

(Continued)

*Primary Examiner* — Suraj M Joshi

(57) ABSTRACT

There are provided a method for processing an exceptional case of establishing a default bearer and a device therefor in order to solve a problem in that a user equipment cannot actually receive an IP service by accessing a packet network while failing in establishing the default bearer in a mobile communication system. A method for processing an exceptional case of establishing a default bearer in a mobility management entity includes: receiving a network attachment request from a user equipment; transmitting a network attachment acceptance including an activation request of the default bearer to the user equipment in response to the network attachment request; and cancelling a network attachment procedure when a completion response to the
(Continued)

activation request of the default bearer is not received from the user equipment within a predetermined time.

13 Claims, 4 Drawing Sheets

Related U.S. Application Data continuation of application No. 14/959,522, filed on Dec. 4, 2015, now Pat. No. 9,565,710, which is a continuation of application No. 13/058,719, filed as application No. PCT/KR2009/004471 on Aug. 11, 2009, now Pat. No. 9,237,594.

(51) Int. Cl.
*H04W 72/04* (2009.01)
*H04W 80/04* (2009.01)

(56) References Cited

OTHER PUBLICATIONS

Qualcomm Europe, "Update on Timer section" (http://www.3gpp.org/DynaReport/TDocExMtg-C1-53-26747.htm, May 2009) (Year: 2009).*

"3rd Generation Partnership Project: Technical Specification Group Core Netowrk and Terminals; Non-Access-Stratum (NAS) protocol for Evolved Packet System (EPS); Stage 3 (Release 8)", 3GPP Standard, 3GPP TS 24.301, v0.4.0, pp. 1-141, Jul. 1, 2008 (Year: 2008).*

Qualcomm Europe, "Update on default bearer context activation" (http://www.3gpp.org/DynaReport/TDocExMtg-C1-53-26747.htm, May 2009) (C1-081672).

Qualcomm Europe, "Update on Timer section" (http://www.3gpp.org/DynaReport/TDocExMtr-C1-53-26747.htm, May 2009) (C-081994).

International Search Report for PCT/KR2009/004471 dated Nov. 24, 2010.

"Update on default bearer context activation" (http://www.3gpp.org/DynaReport/TDocExMtg-C1-53-26747.htm, May 2009) (C1-081672).

Qualcomm Europe, "Update on Timer section" (http://www.3gpp.org/DynaReport/TDocExMtg-C1-53-26747.htm, May 2009) (C1-081994).

"3rd Generation Partnership Project: Technical Specification Group Core Network and Terminals; Non-Access-Stratum NAS) protocol for Evolved Packet System (EPS); Stage 3 (Reelease 8)", 3GPP Standard; 3GPP TS 24.301, v0.4.0, pp. 1-141, Jul. 1, 2008.

Panasonic, "P-CR: Flexible Concatenation of ESM messages during Attach", 9.2.2, 3GPP TSG CT WG1 Meeting #54, Jun. 23-27, 2008, Zagreb, Croatia.

Non-Final Office Action and list of references dated Sep. 26, 2013 for U.S. Appl. No. 13/058,719.

Non-Final Office Action and list of references dated May 6, 2014 for U.S. Appl. No. 13/058,719.

Final Office Action dated Dec. 4, 2014 for U.S. Appl. No. 13/058,719.

Advisory Action dated Mar. 26, 2015 for U.S. Appl. No. 13/058,719.

Notice of Allowance dated Aug. 31, 2015 for U.S. Appl. No. 13/058,719.

Non-final Office Action and list of references dated Feb. 12, 2016 for U.S. Appl. No. 14/959,522.

Notice of Allowance and list of references dated Sep. 26, 2016 for U.S. Appl. No. 14/959,522.

Non-final Office Action and list of references dated Jul. 14, 2017 for U.S. Appl. No. 15/417,989.

Final Office Action dated Apr. 6, 2018 for U.S. Appl. No. 15/417,989.

\* cited by examiner

[Fig. 1]
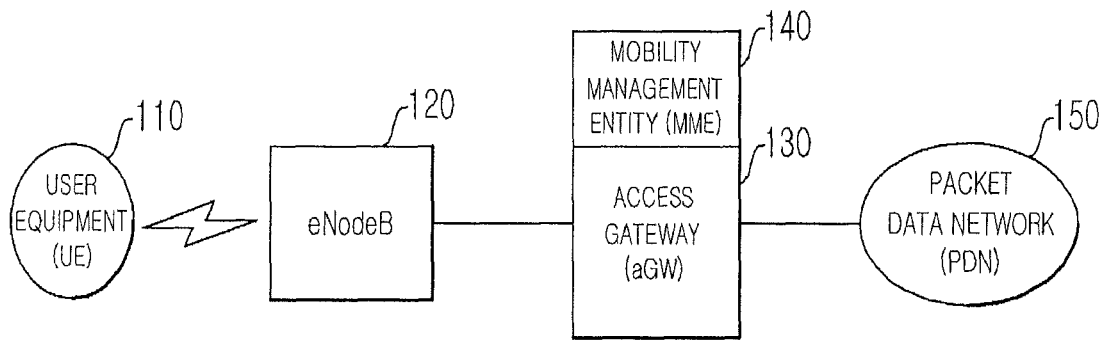
[Fig. 2]
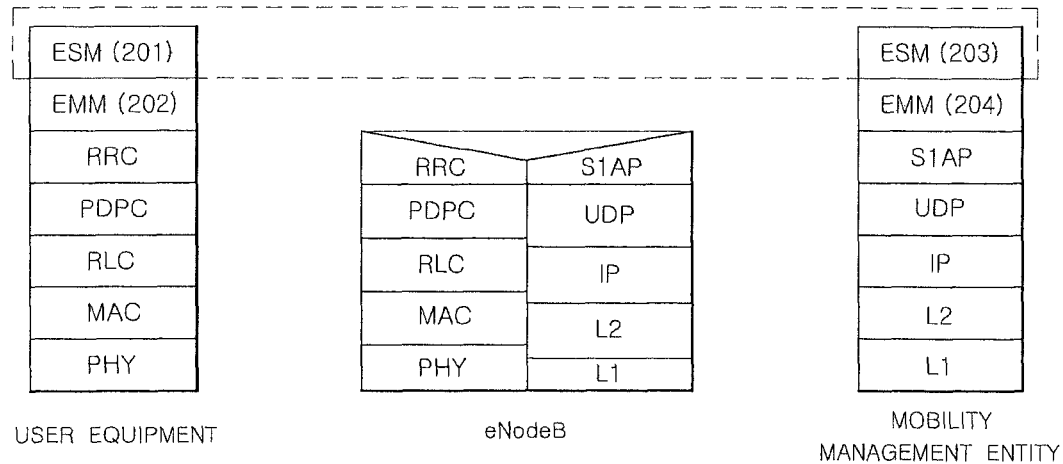

[Fig. 3]
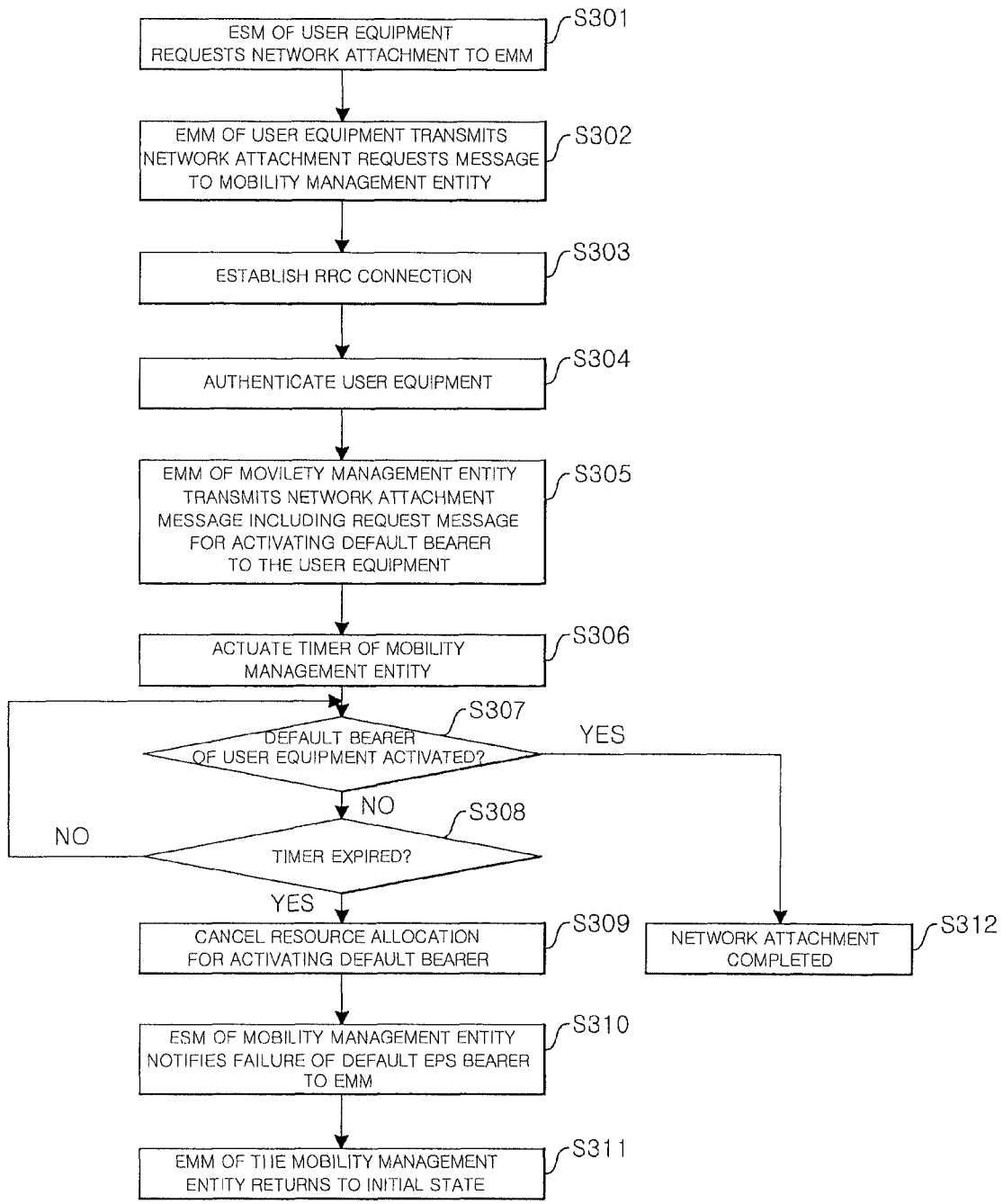

[Fig. 4]
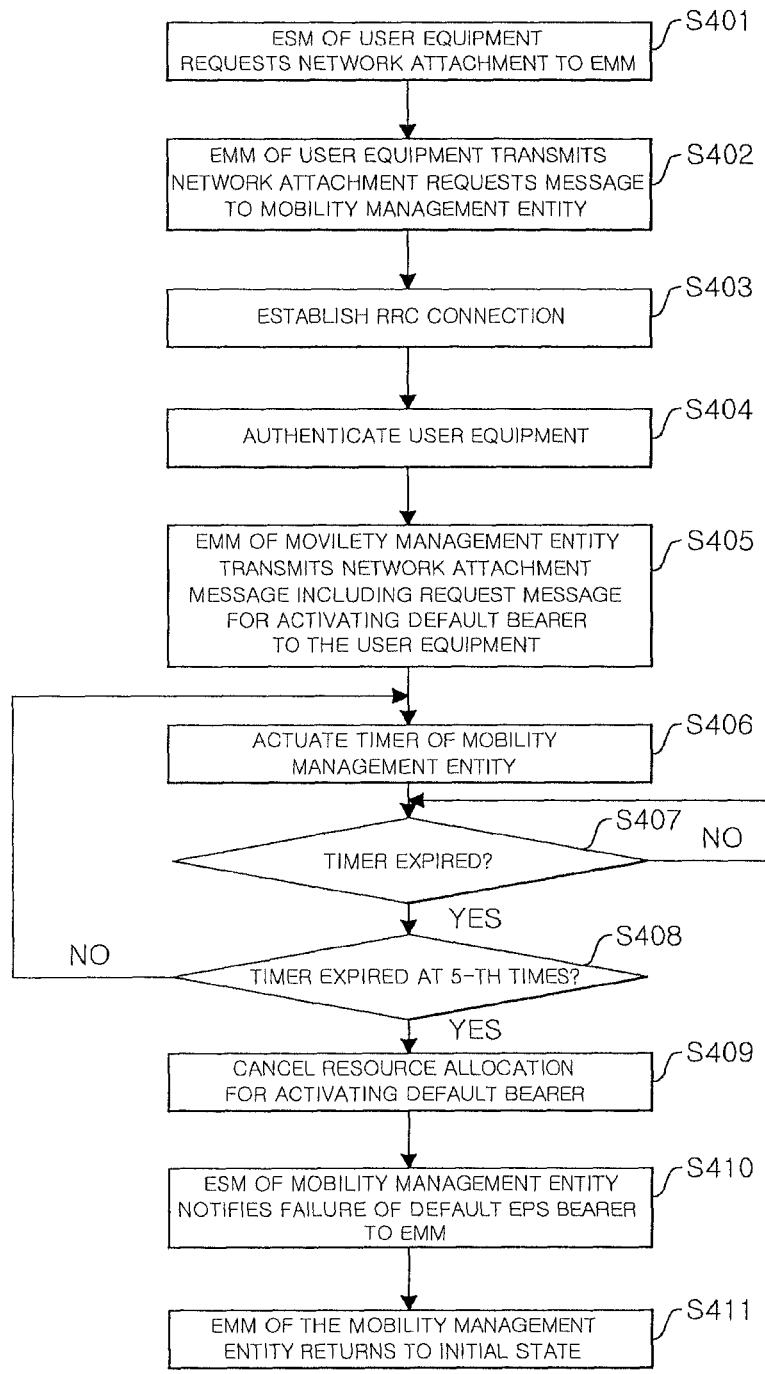

[Fig. 5]
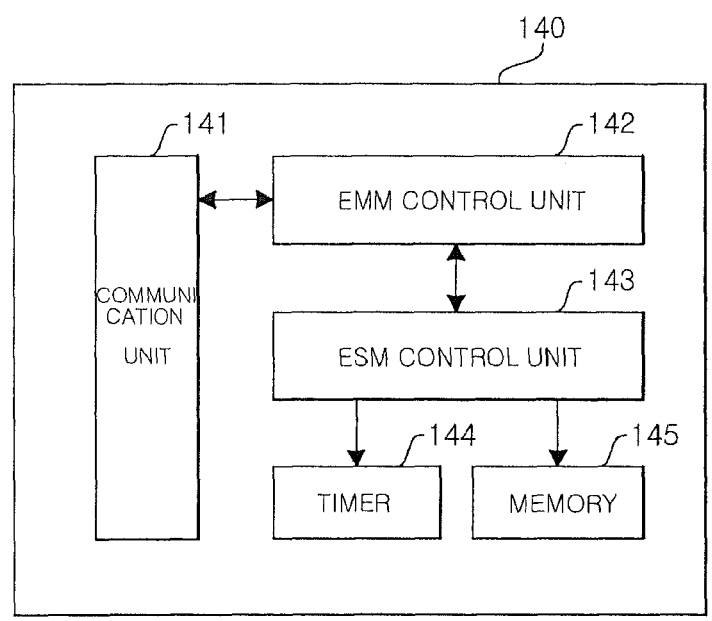

METHOD FOR PROCESSING EXCEPTIONAL CASE OF ESTABLISHING DEFAULT BEARER IN MOBILE COMMUNICATION SYSTEM AND DEVICE THEREFOR

CROSS-REFERENCE TO RELATED APPLICATIONS

This application is a Continuation of U.S. application Ser. No. 15/417,989 filed Jan. 27, 2017, now pending, which is a Continuation of U.S. application Ser. No. 14/959,522 filed December 4, 2015 and issued as U.S. Pat. No. 9,565,710, which is a Continuation of U.S. application Ser. No. 13/058,719 filed Feb. 11, 2011 and issued as U.S. Pat. No. 9,237,594, which is a national entry under 35 U.S.C. Section 371, of PCT International Application No. PCT/KR2009/004471, filed Aug. 11, 2009, which claimed priority to Korean Application No. 10-2008-0078446, filed Aug. 11, 2008 and Korean Application No. 10-2009-0068532, filed Jul. 27, 2009 in the Korean Patent Office, the disclosures of which are hereby incorporated by reference.

TECHNICAL FIELD

An exemplary embodiment of the present invention relates to a method for processing an exceptional case of establishing a default bearer and a device therefor.

BACKGROUND ART

An advanced third generation mobile communication system has introduced a concept of a default bearer in order to rapidly control various packet services and facilitate management of a service quality. Upper layer service context information for the default bearer is generated when a user equipment is firstly registered in a packet network and is always present in a terminal and a network regardless of signaling connection between the user equipment and the packet network when the user equipment is registered in the packet network.

A resource is allocated to the default bearer while the signaling connection between the user equipment and the packet network is established. When the signaling connection is cancelled, the corresponding resource is also cancelled. Since an Internet protocol (IP) signaling packet (i.e., ICMP), an IP application signaling packet (i.e., SIP) or an IP packet (i.e., E-mail) having a service quality of a 'best-effort' type are transmitted through the default bearer, the default bearer is the basis of the advanced third generation mobile communication system.

A procedure of establishing the default bearer is performed by being included in an attachment procedure to be executed for the user equipment to firstly access the packet network. An exceptional case may occur in which only the attachment procedure is completed while the default bearer may not normally established due to various reasons.

At this time, even if the user equipment accesses the packet network, the user equipment cannot receive an IP service, a procedure for processing the exceptional case is required.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method for processing an exceptional case of establishing a default bearer in failing in establishing the default bearer and a device therefor.

Solution to Problem

An exemplary embodiment of the present invention provides a method for processing an exceptional case of establishing a default bearer in a mobility management entity of a mobile communication system includes: receiving a network attachment request from a user equipment; transmitting a network attachment acceptance including an activation request of the default bearer to the user equipment in response to the network attachment request; and cancelling a network attachment procedure when a completion response to the activation request of the default bearer is not received from the user equipment within a predetermined time.

Herein, cancelling the network attachment procedure includes determining whether or not the predetermined time elapses by using a timer and further includes retransmitting the network attachment acceptance to the user equipment when the timer is expired while the completion response to the activation request of the default bearer is not received.

Another embodiment of the present invention provides a device for processing an exceptional case of establishing a default bearer in a mobile communication system includes: a communication unit that supports a communication protocol for transmitting and receiving a request and a response depending on a network attachment procedure to and from a user equipment; and a control unit that transmits a network attachment acceptance including an activation request of the default bearer in response to the network attachment request of the user equipment to the user equipment and cancels the network attachment procedure when a complete response to the activation request of the default bearer is not received from the user equipment within a predetermined time and further includes a timer for determining whether or not the predetermined time elapses.

Herein, the control unit retransmits a message of the network attachment acceptance to the user equipment when the timer is expired while the complete response to the activation request of the default bearer is not received within the predetermined time.

Yet another embodiment of the present invention provides a method for processing an exceptional case of establishing a default bearer in a mobility management entity of a mobile communication system includes: receiving a network attachment request from a user equipment; transmitting a network attachment acceptance including an activation request of the default bearer to the user equipment in response to the network attachment request; and cancelling a network attachment procedure when a complete response to the activation request of the default bearer is not received from the user equipment until a timer is expired at the predetermined times.

Herein, cancelling the network attachment procedure includes: retransmitting the network attachment acceptance to the user equipment whenever the timer is expired; and reactuating the timer after retransmitting the network attachment acceptance.

There is provided a reliable IP service by providing an operational procedure for an exceptional case in which only an attachment procedure is completed while a default bearer is not normally established.

BRIEF DESCRIPTION OF DRAWINGS

FIG. 1 is a schematic block diagram illustrating a configuration of an advanced third generation mobile communication system.

FIG. 2 illustrates a protocol stack of a control plane of an advanced third generation mobile communication system according to an exemplary embodiment of the present invention.

FIGS. 3 and 4 are flowcharts illustrating a method of establishing a default bearer for each step according to an exemplary embodiment of the present invention.

FIG. 5 is a block diagram illustrating a configuration of a mobility management entity that processes an exceptional case of establishing a default bearer according to an exemplary embodiment of the present invention.

BEST MODE FOR CARRYING OUT THE INVENTION

In the following detailed description, only certain exemplary embodiments of the present invention have been shown and described, simply by way of illustration. Accordingly, the drawings and description are to be regarded as illustrative in nature and not restrictive. Like reference numerals designate like elements throughout the specification. In the specification, unless explicitly described to the contrary, the word "comprise" and variations such as "comprises" or "comprising", will be understood to imply the inclusion of stated elements but not the exclusion of any other elements.

In the specification, a user equipment (UE) may designate a mobile terminal (MT), a mobile station (MS), a terminal, a subscriber station (SS), a portable subscriber station (PSS), an access terminal (AT), etc. or and may include the entire or partial functions of the mobile terminal, the terminal, the mobile station, the subscriber station, the portable subscriber station, the access terminal, etc.

In the specification, an evolved Node-B may designate a base station (BS), an access point (AP), a radio access station (RAS), a node-B, a base transceiver station (BTS), a mobile multihop relay (MMR)-BS, etc. and may include the entire or partial functions of the BS, the AP, the RAS, the node-B, the BTS, the MMR-BS, etc.

FIG. 1 is a schematic block diagram illustrating a configuration of an advanced third generation mobile communication system.

In the embodiment, the mobile communication system includes a user equipment (UE) 110, an evolved Node-B (eNB) 120, an access gateway (aGW) 130, and a mobility management entity (MME) 140.

The user equipment 110 accesses the eNB 120 through a wireless interface and the eNB 120 accesses the access gateway 130 through a wired interface. Further, the access gateway 130 is connected to an external packet data network (PDN) 150 through an Internet protocol (IP) interface. The mobility management entity 140 supports a control protocol of the third generation mobile communication system, and controls a packet service and a bearer through a signaling procedure with the user equipment 110.

The user equipment 110 performs IP-based packet transmission and reception with a server (not shown) located on the packet data network 150 or a corresponding node (not shown). The bearer needs to be established among the user equipment 110, the eNB 120, and the access gateway 130 in order to transmit and receive IP packets.

The user equipment 110 can establish one or more bearers for one packet data network 150. The bearer includes a default bearer that is basically established with address allocation at the time of accessing each packet data network and a dedicated bearer that is additionally established by a request of quality of service (QoS) at the time of performing a service. The embodiment of the present invention relates to a processing procedure when the default bearer of two bearers is not normally established.

FIG. 2 illustrates a protocol stack of a control plane of an advanced third generation mobile communication system according to an exemplary embodiment of the present invention.

In FIG. 2, the protocol stack of the control plane for the user equipment includes an evolved session management (ESM) layer 201 that manages a session including the default bearer, an evolved mobility management (EMM) layer 202 that manages mobility, a radio resource control (RRC) layer that manages a radio resource, a radio link control layer (RLC) layer that controls a radio link, a media access control (MAC) layer that controls access of media, and a physical (PHY) layer which is a physical layer.

Further, In FIG. 2, the protocol stack of the control plane for the mobility management entity includes an evolved session management (ESM) layer 203 that manages a session including the default bearer and an evolved mobility management (EMM) layer 204 that manages mobility, and in addition, includes an SI application (SIAP) layer, a user datagram protocol (UDP) layer, an Internet protocol (IP) layer, layer 2 (L2) layer, and a layer 1 (LI) layer.

Hereinafter, a method of establishing the default bearer according to an exemplary embodiment of the present invention will be described with reference to the protocol stack of the control plane of FIG. 2.

FIGS. 3 and 4 are flowcharts illustrating a method of establishing a default bearer for each step according to an exemplary embodiment of the present invention.

Referring to FIG. 3, when the user equipment 110 firstly accesses the packet data network 150, the ESM layer 201 of the user equipment 110 requests the EMM layer 202 to perform an attachment procedure in the packet data network (S301). The EMM layer 202 that receives the attachment request transmits an attachment request message (i.e., ATTACH_REQUEST) to the mobility management entity 140 through the eNB120 (S302).

The mobility management entity 140 that receives the attachment request message establishes an RRC connection to allocate the resource to the user equipment 110 (S303) and performs an authentication procedure of the user equipment 110 (S304). When authentication is successively performed, the EMM layer 204 of the mobility management entity 140 transmits an attachment acceptance message (i.e., ATTACH_ACCEPT) to the user equipment 110 (S305). The attachment acceptance message includes a message (i.e., Active_Default_EPS_Bearer_Context_Request) of requesting the user equipment 110 to activate the default bearer.

Thereafter, the ESM layer 203 of the mobility management entity 140 drives a predetermined timer (i.e., T3485 timer or T3450 timer) for supervising whether or not the default bearer is activated in the user equipment 110 (S306). If a response message (i.e., Active_Default_EPS_ Bearer_Context_Complete or ATTACH_COMPLETE) to the activation request of the default bearer is not received from the user equipment 110 (S308) until the timer is expired (S307), the ESM layer 203 cancels the resource allocated for establishing the default bearer at step S303 (S309) and notifies a failure in establishing the default bearer to the EMM layer 204 of the mobility management entity 140 (S310).

The EMM layer 204 that receives the notification of the failure in establishing the default bearer initializes all establishments for the user equipment 110 and waits to receive the attachment acceptance message again (S311).

If the response message (i.e., Active_Default_EPS_Bearer_Context_Complete or ATTACH_COMPLETE) to the activation request of the default bearer from the user equipment 110 before the timer is expired at step S307 (S308), attachment of the user equipment 110 to the network is normally completed. (S312).

A time taken to activate the default bearer may be longer than a predetermined time set in the timer. For this, the ESM layer 203 of the mobility management entity 140 can determine the failure in establishing the default bearer or not through an expiration frequency of the timer. FIG. 4 is a flowchart illustrating a processing procedure in this case.

In FIG. 4, steps S401 to S406 and steps S409 to S411 are the same as steps S301 to S306 and steps S309 to S311 of FIG. 3. Therefore, steps S407 and S408 will be described herein.

That is, the ESM layer 203 of the mobility management entity 140 reactuates the timer until the timer is expired at the n–1-th times (n is a natural number equal to or larger than 2), but if the response message (i.e., active_Default_EPS_Bearer_Context_Complete or ATTACH_COMPLETE) to the activation request of the default bearer is not received from the user equipment 110 (5408) until the timer is expired (5407) at the n-th times, the E5M layer 203 cancels the resource allocated for establishing the default bearer at step 5403 (5409) and notifies the failure in establishing the default bearer to the EMM layer 204 of the mobility management entity 140 (5410).

For example, the E5M layer 203 reactuates the timer until the timer is expired at the 4-th times, but if the response message to the activation request of the default bearer is not received from the user equipment 110 until the timer is expired at the 5-th times, the E5M layer 203 cancels the resource allocated for establishing the default bearer and notifies the failure in establishing the default bearer to the EMM layer 204.

The EMM layer 204 that receives the notification of the failure in establishing the default bearer initializes all establishments for the user equipment 110 and waits to receive the attachment acceptance message again (5310).

Even when the default bearer is not established, an access to the corresponding packet data network is possible, but an actual IP service is impossible, such that an incomplete access is made. However, if the default bearer is not established up to a pre-determined time or a temporary identifier is not reallocated, an operation of the EMM layer is initialized through the notification of the failure to disable accessing the packet data network and allow the establishment procedure of the default bearer to be re-executed in the initialization state.

FIG. 5 is a block diagram illustrating a configuration of a mobility management entity 140 that processes an exceptional case of establishing a default bearer according to an exemplary embodiment of the present invention. The mobility management entity 140 of the embodiment includes a communication unit 141, an ESM control unit 142, an EMM control unit 143, a timer 144, and a memory 145.

The communication unit 141 transmits and receives various message for a network connection and a mobility management to and from the user equipment 110 through the eNode-B 120 under the control of the EMM control unit 143.

When the ESM control unit 142 receives the attachment request message of the user equipment 110 through the communication unit 141, the ESM control unit 142 allocates the resource to the user equipment 110 by establishing the RRC connection and performs an authentication procedure of the user equipment 110. The mobility management entity 140 includes the memory 145 that stores user authentication information.

When the authentication is successively performed, the ESM control unit 142 transmits to the EMM control unit 143 of the mobility management entity 140 a request message (i.e., Active_Default_EPS_Bearer_Context_Request) for activating the default bearer to the user equipment 110. The EMM control unit 143 transmits the attachment acceptance message (i.e., ATTACH_ACCEPT) including the activation request of the default bearer to the user equipment 110.

The ESM control unit 142 actuates the timer 144 (i.e., T3485 timer or T3450 timer) just after the ESM control unit 142 transmits the request message for activating the default bearer or just after the EMM control unit 143 transmits the attachment ac-ceptance message. In addition, when the default bearer is not activated with respect to the activation request of the default bearer until the timer 144 is expired, the ESM control unit 142 cancels the resource allocated for establishing the default bearer and notifies the failure in establishing the default bearer to the EMM control unit 143. When the failure in establishing the default bearer is notified from the ESM control unit 142, the EMM control unit 143 initializes all establishments for the user equipment 110.

The ESM control unit 142 can determine the failure in establishing the default bearer or not in accordance with an expiration frequency of the timer 144. In other words, the ESM control unit 142 reactuates the timer until the timer 144 is expired at the n–1-th times (n is a natural number equal to or larger than 2), but when the default bearer is not activated until the timer is expired at the n-th times, the ESM control unit 142 cancels the resource allocated for establishing the default bearer and notifies the failure in establishing the default bearer to the EMM control unit 143. As one example, the ESM control unit 142 reactuates the timer until the timer 144 is expired at the 4-th times, but when default bearer is not activated until the timer is expired at the 5-th times, the ESM control unit 142 cancels the resource allocated for establishing the default bearer and notifies the failure in establishing the default bearer to the EMM control unit 143

The above-mentioned exemplary embodiments of the present invention are not embodied only by a method and apparatus. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A communication method, comprising:

receiving a first message from a user equipment, the first message requesting to attach the user equipment to a network to start a network attachment procedure;

transmitting, from a device in a Mobile Management Entity (MME), a second message, the second message comprising a request to activate a context for a default bearer;

determining, by the device in the MME, that a predetermined time has passed; and terminating, by the device in the MME, the network attachment procedure if a third message indicating that the context for the default bearer is activated has not been received from the user equipment within the predetermined time, wherein the third message is transmitted from the user equipment only after the context for the default bearer is activated.

2. The method of claim 1, further comprising:

assigning radio resources for the default bearer to the user equipment, wherein terminating the network attachment procedure comprises releasing the radio resources.

3. The method of claim 2, wherein determining that the predetermined time has passed is performed based on a timer.

4. The method of claim 3, further comprising:

transmitting, from the device, a fourth message to the user equipment if the third message has not been received until the timer expires, and resetting the timer to start running, wherein the fourth message comprises a request to activate a context for a default bearer.

5. The method of claim 3, further comprising:

transmitting another message comprising a request to activate a context for a default bearer and resetting the time to start running each time the timer expires n times, where n is a positive integer greater than 1, until the third message is received.

6. The method of claim 1, wherein terminating the network attachment procedure by the device comprises aborting the network attachment procedure after transmitting five messages each comprising a request to activate a context for a default bearer.

7. The device of claim 6, wherein the circuitry is configured to, in terminating the network attachment procedure, abort the network attachment procedure after transmitting five messages each comprising a request to activate a context for a default bearer.

8. A communication device in a Mobile Management Entity (MME), the device comprising:

a circuitry which is configured to:

cause the device to receive a first message from a user equipment, the first message requesting to attach the user equipment to a network to start a network attachment procedure;

cause the device to transmit a second message, the second message comprising a request to activate a context for a default bearer;

determine that a predetermined time has passed; and cause the device to terminate the network attachment procedure if a third message indicating that the context for the default bearer is activated has not been received from the user equipment within the predetermined time, wherein the third message is transmitted from the user equipment only after the context for the default bearer is activated.

9. The device of claim 8, wherein the circuitry is further configured to:

cause the device to assign radio resources for the default bearer to the user equipment, wherein terminating the network attachment procedure comprises releasing the radio resources.

10. The device of claim 9, wherein the circuitry is configured to determine that the predetermined time has passed based on a timer.

11. The device of claim 10, wherein the circuitry is further configured to:

cause the device to transmit a fourth message to the user equipment if the third message has not been received until the timer expires, and resetting the timer to start running, wherein the fourth message comprises a request to activate a context for a default bearer.

12. The device of claim 10, wherein the circuitry is further configured to:

cause the device to transmit another message comprising a request to activate a context for a default bearer and reset the time to start running each time the timer expires n times, where n is a positive integer greater than 1, until the third message is received.

13. A user equipment (UE), comprising:

a circuitry which is configured to:

cause the UE to transmit a first message to a device in a Mobile Management Entity (MME), the first message requesting to attach the user equipment to a network to start a network attachment procedure;

cause the UE to receive, from the device, a second message comprising a request to activate a context for a default bearer;

cause the UE to receive, from the device, a third message comprising the request to activate the context for the default bearer after a predetermined period has passed since reception of the second message;

cause the UE to activate the context for the default bearer; and cause the UE to transmit a fourth message indicating that the context for the default bearer is activated only after the context for the default bearer is activated by the UE.

* * * * *